Patented Feb. 18, 1930

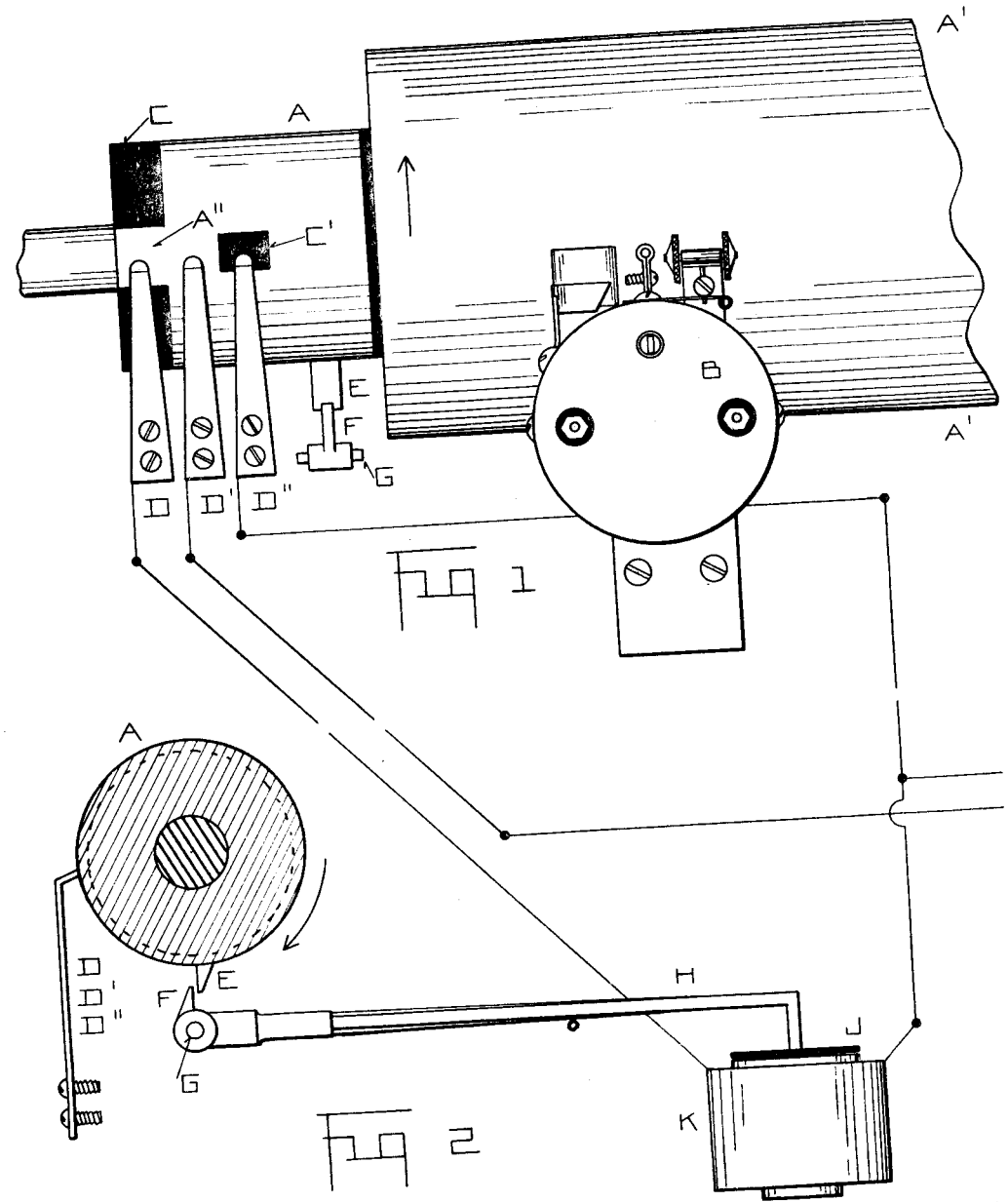

1,747,839

UNITED STATES PATENT OFFICE

JOHN N. OGLE, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SYNCHRONIZER RELEASE

Application filed March 27, 1928. Serial No. 265,066.

This instrument relates to devices for receiving weather maps transmitted by radio, and has particular reference to means for obtaining accuracy in synchronism, in mechanisms where the recording surface is stopped and started at the beginning of each record line.

With this and other objects in view the invention consists of the novel combination of parts herein described and illustrated, and more particularly pointed out in the claims.

In the drawings Figure 1 is an elevation of parts of the machine, and Figure 2 further details thereof.

In the figures, A is an extension of the cylinder A' upon which latter the base map is fastened, i. e., the base map on which the weather is to be recorded by the pen box B. The extension A has a metallic sleeve thereon, and with the portions C and C' of insulated material. Bearing against the cylinder extension A are three brushes D, D' and D''. As shown in the drawing D' rests on the narrow portion A'', of the metal sleeve, while D'' rests on the insulating block C'. D' is in constant electrical contact with the sleeve A. E is a pin in the cylinder extension A, which engages with the detent F of the hub pivoted at G, which hub has a long arm H. The free end of the arm H has thereon an iron armature J which, when at rest, is in intimate contact with the pole-pieces of the electro-magnet K.

The cylinder A—A' is driven by any suitable motive power to which it is attached by frictional means.

The brush D' is attached to one side of the usual electrical circuit carrying amplified radio signals. The brush D'' is attached to the pen box B. The brush D is attached to the solenoid K. The return circuit wires from both B and K are attached to the opposite side of the electric circuit mentioned.

When the cylinder A is in the position shown, obviously current through brush D' would traverse the metallic sleeve A through the extension A'' to the brush D, and thence to the solenoid K. The brush D'' resting on the insulated block C' is in an incompleted circuit. Therefore, any received signal energizes electro-magnet K and grips the armature J, so that, with the cylinder A assumed to be in rotation, the pin E comes in contact with the detent F, and the cylinder is stopped (it is frictionally driven), and held immovable until the incoming signal energizing K, ceases. The absence of current releases the armature J so that the lever H can rise and permit the pin E to slip off the point of detent F.

The further rotation of the cylinder A—A' insulates the brush D and puts the brush D'' on to the sleeve A completing the circuit through the pen box B; the functioning of which, however, is of no interest in connection with the present invention, and is, therefore, not further described.

The accuracy with which the cylinder is released for continued rotation is of extreme importance where refinement of detail is required in the received weather map. It has been found, therefore, that gripping the armature J to the face of the pole-pieces of the rigidly fixed solenoid K produces an accuracy not heretofore attained by any other latching mechanism known to applicant, and therein lies the great value of this invention.

The absence of a multiplicity of triggers and joints of available mechanisms which might be used instead of the method herein described, makes for a high degree of accuracy of register of incoming signals upon a printed base on the receiving machine. Gripping the armature directly to the face of the pole-pieces of the electro-magnet, so as to use the face of the poles as the line of registry determination is the essence of this registry method.

Obviously, a lining of the face of the poles to prevent the armature sticking thereto on occassion of excessive flux does not change the merits of the method, though a less current may be effectively used where no lining is incorporated in the mechanism, which is desirable on occasions.

Having thus pointed out the value of this invention what I claim is—

1. In a picture transmitting and reproducing system, a rotating picture drum comprising a latch member rotating with said drum, said member comprising a short arm and a long arm at an angle to each other, said member being pivoted substantially at the intersection of said arms and adjacent to the path of said latch member, a fixed electro-magnet and an armature for said electro-magnet and attached to the non-pivoted end of said long arm.

2. In a picture transmitting and reproducing system, a rotating picture drum, a commutator driven by said drum, a start-stop electro-magnet controlled by said commutator, said control member having a short arm and a long arm at an angle to each other, and mounted for pivotal movement as a unit about a fixed pivot, said pivot being substantially at the intersection of said arms, means including an armature attached to the non-pivoted end of said long arm for controlling the normal position of said short arm with respect to said latch member when said magnet is energized.

3. A system according to claim 2, in which said commutator is effective to operate said magnet under control of received currents only at regular recurring intervals during the drum's rotation.

In testimony whereof I have affixed my signature.

JOHN N. OGLE.